(12) United States Patent
Yu et al.

(10) Patent No.: US 8,582,674 B2
(45) Date of Patent: Nov. 12, 2013

(54) APPARATUS AND METHOD FOR CHANNEL ESTIMATION USING COMPRESSIVE SENSING BASED ON TAYLOR SERIES EXPANSION

(75) Inventors: Yingqun Yu, San Diego, CA (US); Farrokh Abrishamkar, San Diego, CA (US); Ni-Chun Wang, San Diego, CA (US); Ori Shental, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 435 days.

(21) Appl. No.: 12/950,435

(22) Filed: Nov. 19, 2010

(65) Prior Publication Data

US 2011/0286507 A1 Nov. 24, 2011

Related U.S. Application Data

(60) Provisional application No. 61/263,885, filed on Nov. 24, 2009, provisional application No. 61/263,891, filed on Nov. 24, 2009.

(51) Int. Cl.
*H04L 27/28* (2006.01)

(52) U.S. Cl.
USPC .......................................... 375/260

(58) Field of Classification Search
USPC .......................................... 375/260
See application file for complete search history.

(56) References Cited

U.S. PATENT DOCUMENTS

| | | | |
|---|---|---|---|
| 7,436,912 B2 | 10/2008 | Fudge et al. | |
| 7,583,755 B2 * | 9/2009 | Ma et al. | 375/316 |
| 8,213,525 B2 | 7/2012 | Caire et al. | |
| 8,218,658 B2 * | 7/2012 | Hung et al. | 375/260 |
| 8,243,860 B1 | 8/2012 | Lee et al. | |
| 8,305,843 B2 | 11/2012 | Dahl et al. | |
| 8,320,489 B2 | 11/2012 | Bajwa et al. | |
| 2005/0281324 A1 * | 12/2005 | Wallen | 375/148 |
| 2009/0222226 A1 | 9/2009 | Baraniuk et al. | |
| 2010/0182950 A1 | 7/2010 | Sexton et al. | |
| 2010/0310011 A1 | 12/2010 | Sexton et al. | |
| 2011/0006768 A1 | 1/2011 | Ying et al. | |
| 2011/0043710 A1 | 2/2011 | Samarasooriya et al. | |
| 2011/0286498 A1 | 11/2011 | Abrishamkar et al. | |
| 2011/0286558 A1 | 11/2011 | Abrishamkar et al. | |

OTHER PUBLICATIONS

Akansu A N, et al., "Emerging applications of wavelets: A review", Physical Communication, vol. 3, No. 1, Mar. 1, 2010, pp. 1-18, XP026833161, ISSN: 1874-4907 [retrieved on Jul. 9, 2009].

Berger C R, et al., "Sparse channel estimation for multicarrier underwater acoustic communication: From subspace methods to compressed sensing", OCEANS 2009—Europe, 2009. OCEANS '09, IEEE, Piscataway, NJ, USA, May 11, 2009, pp. 1-8, XP031540788, ISBN: 978-1-4244-2522-8.

(Continued)

*Primary Examiner* — Kevin Kim
(74) *Attorney, Agent, or Firm* — Stanton Braden

(57) ABSTRACT

An apparatus and method for channel estimation comprising determining a channel impulse response using a Taylor series expansion with a plurality of Taylor series coefficients; determining a channel frequency response based on the channel impulse response; collecting the channel frequency response over a plurality of symbols to obtain a composite channel frequency response; generating a sensing matrix based on the Taylor series expansion; and determining the plurality of Taylor series coefficients based on the composite channel frequency response and the sensing matrix using compressive sensing channel estimation.

40 Claims, 7 Drawing Sheets

(56) References Cited

OTHER PUBLICATIONS

Berger C R, et al., "Sparse channel estimation for OFDM: Overcomplete dictionaries and super-resolution", Signal Processing Advances in Wireless Communications, 2009. SPAWC '09. IEEE 10th Workshop on, IEEE, Piscataway, NJ, USA, Jun. 21, 2009, pp. 196-200, XP031487816, ISBN: 978-1-4244-3695-8.
Bie Zhisong, et al., "Sparsity-based channel state information acquisition and feedback scheme for MIM0-0FDMA systems", Global Mobile Congress 2009, IEEE, Piscataway, NJ, USA, Oct. 12, 2009, pp. 1-4, XP031551162, ISBN: 978-1-4244-5302-3.
Caire G, et al., "Impulse noise cancellation in OFDM: an application of compressed sensing", Information Theory, 2008. ISIT 2008. IEEE International Symposium on, IEEE, Piscataway, NJ, USA, Jul. 6, 2008, pp. 1293-1297, XP031303118, ISBN: 978-1-4244-2256-2.
Christian D Austin, et al., "On the Relation Between Sparse Sampling and Parametric Estimation", Digital Signal Processing Workshop and 5th IEEE Signal Processing Education Workshop, 2009. DSP/SPE 2009. IEEE 13th, IEEE, Piscataway, NJ, USA, Jan. 4, 2009, pp. 387-392, XP031425875, ISBN: 978-1-4244-3677-4.
Figueiredo M.A.T., et al., "Gradient Projection for Sparse Reconstruction: Application to Compressed Sensing and Other Inverse Problems," IEEE Journal of Selected Topics in Signal Processing, Dec. 1, 2007, pp. 586-597, vol. 1 (4), XP011199163.
Georg Taubock, et al., "A compressed sensing technique for OFDM channel estimation in mobile environments: Exploiting channel sparsity for reducing pilots", Acoustics, Speech and Signal Processing, 2008, ICASSP 2008, IEEE International Conference on, IEEE, Piscataway, NJ, USA, Mar. 31, 2008, pp. 2885-2888, XP031251194, ISBN: 978-1-4244-1483-3.
International Search Report and Written Opinion—PCT/US2010/057815—ISA/EPO—Apr. 27, 2011.
Lei Huang, et al., "MMSE-Based MDL Method for Robust Estimation of Number of Sources Without Eigendecomposition", IEEE Transactions on Signal Processing, IEEE Service Center, New York, NY, US, vol. 57, No. 10, Oct. 1, 2009, pp. 4135-4142, XP011269156, ISSN: 1053-587X, DOI: DOI:10.1109/TSP.2009.2024043.
Miosso C J, et al., "Compressive Sensing Reconstruction With Prior Information by Iteratively Reweighted Least-Squares", IEEE Transactions on Signal Processing, IEEE Service Center, New York, NY, US, vol. 57, No. 6, Jun. 1, 2009, pp. 2424-2431, XP011253189, ISSN: 1053-587X.
Nguyen, L.T., et al., "Compressed Sensing using Chaos Filters", 2008, IEEE, pp. 219-223.
Paredes J.L., et al., "Ultra-Wideband Compressed Sensing: Channel Estimation", IEEE Journal of Selected Topics in Signal Processing, IEEE, Oct. 1, 2007, US, pp. 383-395, vol. 1 (3), XP011193162, ISSN: 1932-4553, DOI: DOI:10.1109/JSTSP.2007.906657.
Soltanolkotabi M, et al., "A practical sparse channel estimation for current OFDM standards", Telecommunications, 2009, ICT 09, International Conference on, IEEE, Piscataway, NJ, USA, May 25, 2009, pp. 217-222, XP031485728, ISBN: 978-1-4244-2936-3.
Tropp, J.A., et al., "Random Filters for Compressive Sampling and Reconstruction", 2006, IEEE, pp. 872-875.
Waheed Bajwa U, et al., "Sparse Multipath Channels: Modeling and Estimation", Digital Signal Processing Workshop and 5th IEEE Signal Processing Education Workshop, 2009, DSP/SPE 2009, IEEE 13th, IEEE, Piscataway, NJ, USA, Jan. 4, 2009, pp. 320-325, XP031425863, ISBN: 978-1-4244-3677-4.
Waheed U Bajwa, et al., "Learning sparse doubly-selective channels", Communication, Control, and Computing, 2008 46th Annual Allerton Conference on, IEEE, Piscataway, NJ, USA, Sep. 23, 2008, pp. 575-582, XP031435206, ISBN: 978-1-4244-2925-7.
Yaghoobi M, et al., "Compressible dictionary learning for fast sparse approximations", Statistical Signal Processing, 2009, SSP '09. IEEE/SP 15th Workshop on, IEEE. Piscataway, NJ, USA, Aug. 31, 2009, pp. 662-665, XP031540999, ISBN: 978-1-4244-2709-3.
Yilun Chen, et al., "Sparse LMS for System Identification", Proceeding ICASSP '09 Proceedings of the 2009 IEEE International Conference on Acoustics, Speech and Signal Processing, 2009, pp. 1-4, IEEE Computer Society.
Zayyani H, et al., "Compressed sensing Block MAP-LMS adaptive filter for sparse channel estimation and a Bayesian Cramer-Rao bound", Machine Learning for Signal Processing, 2009. MLSP 2009. IEEE International Workshop on, IEEE, Piscataway, NJ, USA, Sep. 1, 2009, pp. 1-6, XP031557793, ISBN: 978-1-4244-4947-7.
Zhongmin Wang, et al., "Compressed Detection for Pilot Assisted Ultra-Wideband Impulse Radio", Ultra-Wideband, 2007. ICUWB 2007. IEEE International Conference on, IEEE, PI, Sep. 1, 2007, pp. 393-398, XP031159382, ISBN: 978-1-4244-0520-6.

\* cited by examiner

APPARATUS AND METHOD FOR CHANNEL ESTIMATION USING COMPRESSIVE SENSING BASED ON TAYLOR SERIES EXPANSION

CLAIM OF PRIORITY UNDER 35 U.S.C. §119

The present Application for Patent claims priority to Provisional Application No. 61/263,885 entitled Channel Estimation Using Compressive Sensing for LTE and WiMax filed Nov. 24, 2009, and 61/263,891, entitled CSCE Using Taylor Series Expansion, filed Nov. 24, 2009, and assigned to the assignee hereof and hereby expressly incorporated by reference herein.

FIELD

This disclosure relates generally to apparatus and methods for channel estimation in wireless communication. More particularly, the disclosure relates to channel estimation for orthogonal frequency division multiplexing (OFDM) wireless systems using compressive sensing techniques using a Taylor series expansion.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, $3^{rd}$ Generation Partnership Project (3GPP) Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output (SISO), multiple-input single-output (MISO) or a multiple-input multiple-output (MIMO) system.

SUMMARY

Disclosed is an apparatus and method for channel estimation using compressive sensing using a Taylor series expansion. According to one aspect, a method for channel estimation comprising determining a channel impulse response using a Taylor series expansion with a plurality of Taylor series coefficients; determining a channel frequency response based on the channel impulse response; collecting the channel frequency response over a plurality of symbols to obtain a composite channel frequency response; generating a sensing matrix based on the Taylor series expansion; and determining the plurality of Taylor series coefficients based on the composite channel frequency response and the sensing matrix using compressive sensing channel estimation.

According to another aspect, an apparatus for channel estimation comprising means for determining a channel impulse response using a Taylor series expansion with a plurality of Taylor series coefficients; means for determining a channel frequency response based on the channel impulse response; means for collecting the channel frequency response over a plurality of symbols to obtain a composite channel frequency response; means for generating a sensing matrix based on the Taylor series expansion; and means for determining the plurality of Taylor series coefficients based on the composite channel frequency response and the sensing matrix using compressive sensing channel estimation.

According to another aspect, an apparatus for channel estimation comprising a processor and a memory, the memory containing program code executable by the processor for performing the following: determining a channel impulse response using a Taylor series expansion with a plurality of Taylor series coefficients; determining a channel frequency response based on the channel impulse response; collecting the channel frequency response over a plurality of symbols to obtain a composite channel frequency response; generating a sensing matrix based on the Taylor series expansion; and determining the plurality of Taylor series coefficients based on the composite channel frequency response and the sensing matrix using compressive sensing channel estimation.

According to another aspect, a computer-readable medium for channel estimation, the computer-readable medium storing a computer program, wherein execution of the computer program is for: determining a channel impulse response using a Taylor series expansion with a plurality of Taylor series coefficients; determining a channel frequency response based on the channel impulse response; collecting the channel frequency response over a plurality of symbols to obtain a composite channel frequency response; generating a sensing matrix based on the Taylor series expansion; and determining the plurality of Taylor series coefficients based on the composite channel frequency response and the sensing matrix using compressive sensing channel estimation.

Advantages of the present disclosure may include increase performance and efficiency in the case of channel sparsity.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
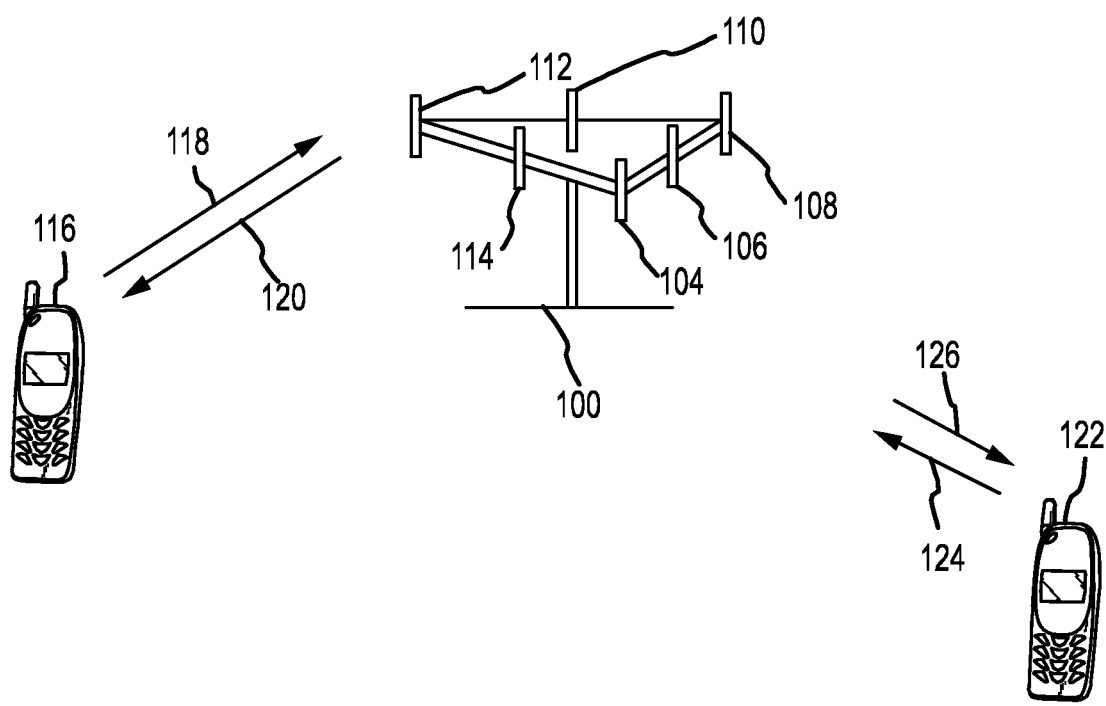
FIG. 1 illustrates an example multiple access wireless communication system according to one example.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a transmission technique. SC-FDMA has similar performance and essentially the same overall complexity as those of an OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, an eNodeB or some other terminology. An access terminal may also be called a mobile terminal, a mobile device, a user equipment (UE), a wireless communication device, terminal, access terminal or some other terminology.

Figure 2:
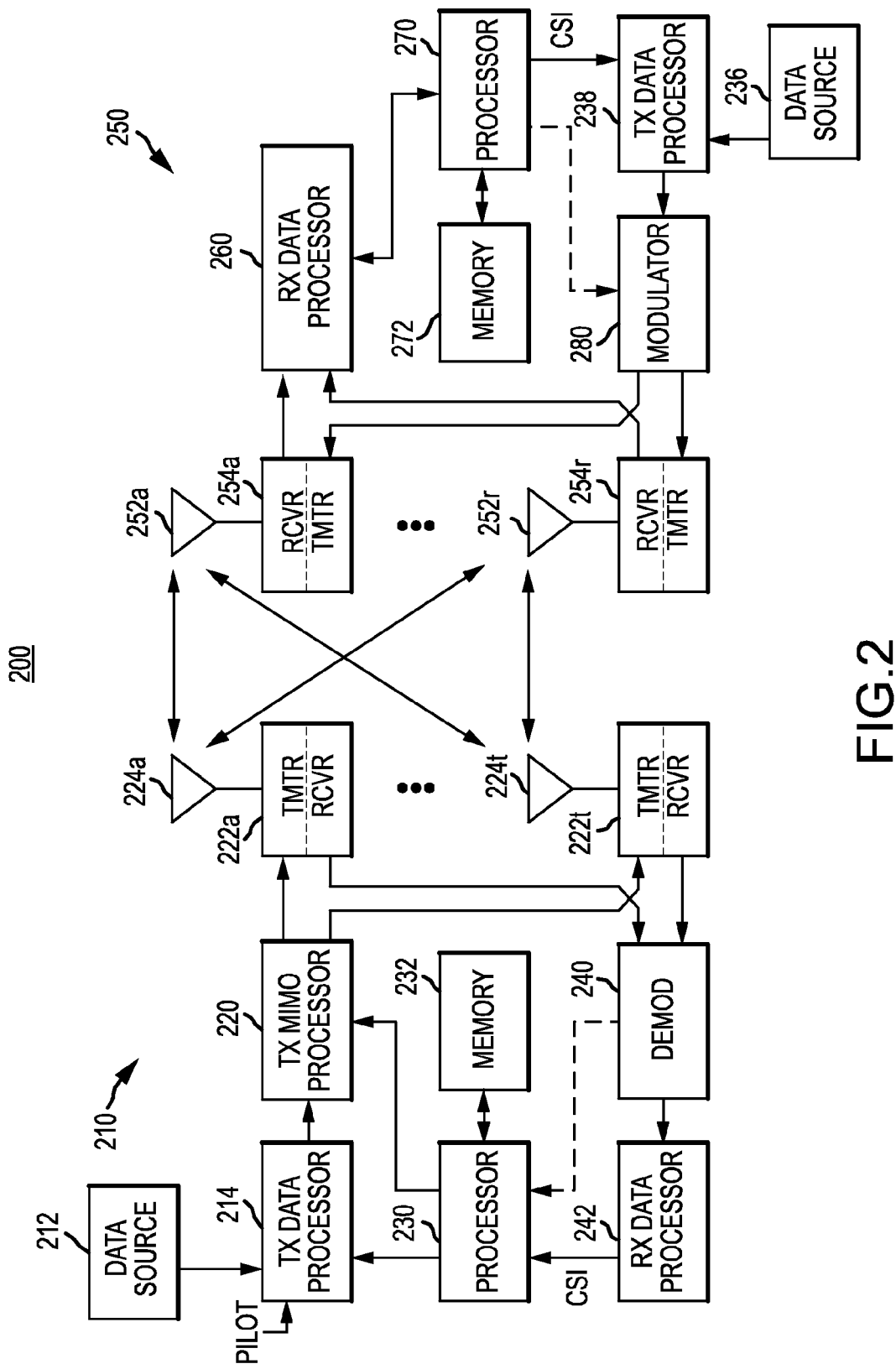
FIG. 2 illustrates an example block diagram of a transmitter system (also known as access point) and a receiver system (also known as access terminal) in a multiple input multiple output (MIMO) system.

FIG. 2 illustrates an example block diagram of a transmitter system 210 (also known as access point) and a receiver system 250 (also known as access terminal) in a multiple input multiple output (MIMO) system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

Figure 3:
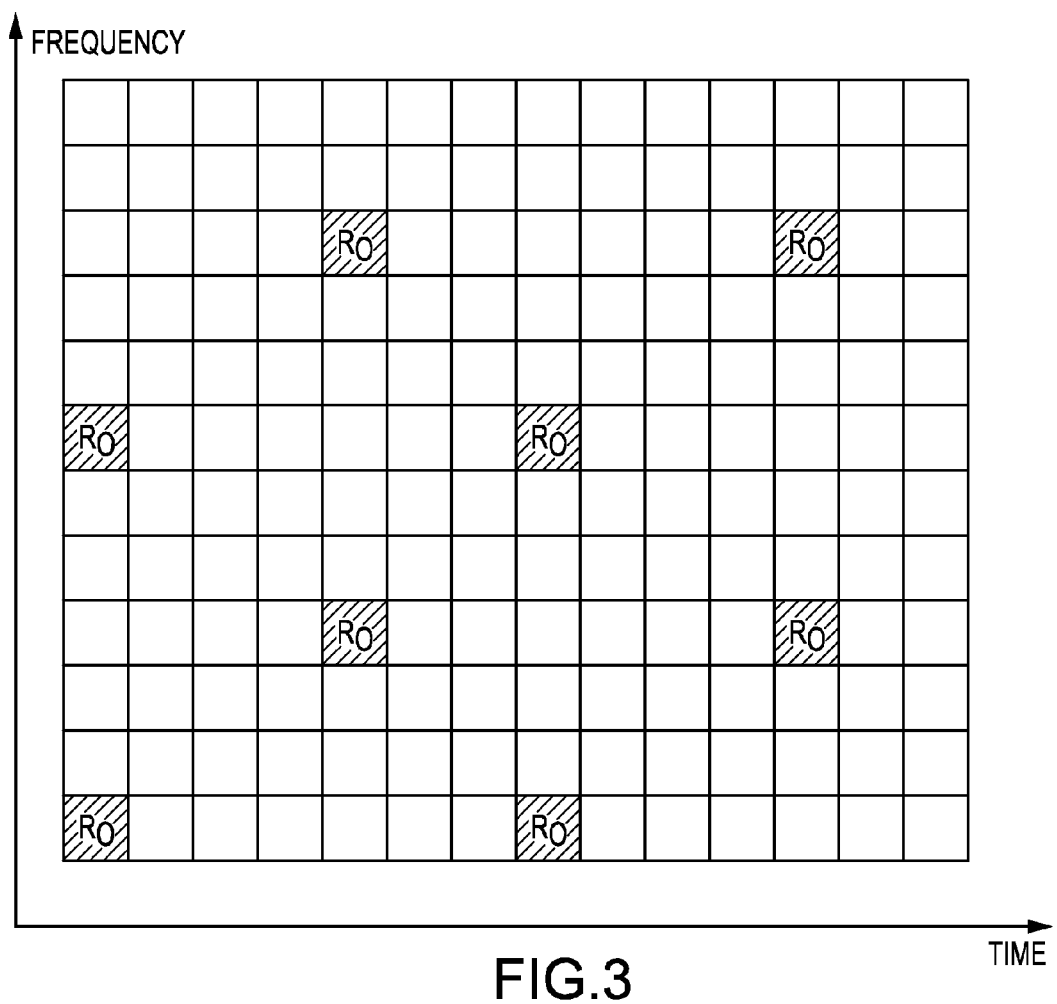
FIG. 3 illustrates an example cell-specific RS arrangement with a normal cyclic prefix (CP) length.

In one aspect, the LTE downlink provides reference signals (RSs), i.e., pilots, within certain locations within an OFDM time-frequency lattice. For example, FIG. 3 illustrates an example cell-specific RS arrangement with a normal cyclic prefix (CP) length. As shown, the RS symbols are shown staggered in the time dimension and frequency dimension according to the expected channel coherence bandwidth and maximum Doppler spread, respectively.

In an aspect, logical channels are classified into Control Channels and Traffic Channels. Logical Control Channels comprise Broadcast Control Channel (BCCH) which is DL channel for broadcasting system control information, Paging Control Channel (PCCH) which is DL channel that transfers paging information, and Multicast Control Channel (MCCH) which is Point-to-multipoint DL channel used for transmitting Multimedia Broadcast and Multicast Service (MBMS) scheduling and control information for one or several MTCHs. Generally, after establishing RRC connection this channel is only used by UEs that receive MBMS (Note: old MCCH+MSCH). Dedicated Control Channel (DCCH) is Point-to-point bi-directional channel that transmits dedicated control information and used by UEs having an RRC connection. In one aspect, Logical Traffic Channels comprises a Dedicated Traffic Channel (DTCH) which is Point-to-point bi-directional channel, dedicated to one UE, for the transfer of user information. Also, a Multicast Traffic Channel (MTCH) for Point-to-multipoint DL channel for transmitting traffic data.

In an aspect, Transport Channels are classified into downlink (DL) and uplink (UL). DL Transport Channels comprise a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), a Uplink Shared Data Channel (UL-SDCH) and plurality of PHY channels. The PHY channels comprise a set of DL channels and UL channels.

In one aspect, the DL PHY channels may comprise one or more of the following:
  Common Pilot Channel (CPICH)
  Synchronization Channel (SCH)
  Common Control Channel (CCCH)
  Shared DL Control Channel (SDCCH)
  Multicast Control Channel (MCCH)
  Shared UL Assignment Channel (SUACH)
  Acknowledgement Channel (ACKCH)
  DL Physical Shared Data Channel (DL-PSDCH)
  UL Power Control Channel (UPCCH)
  Paging Indicator Channel (PICH)
  Load Indicator Channel (LICH)

In one aspect, the UL PHY channels may comprise one or more of the following:
  Physical Random Access Channel (PRACH)
  Channel Quality Indicator Channel (CQICH)
  Acknowledgement Channel (ACKCH)
  Antenna Subset Indicator Channel (ASICH)
  Shared Request Channel (SREQCH)
  UL Physical Shared Data Channel (UL-PSDCH)
  Broadband Pilot Channel (BPICH)

In one aspect, a channel structure is provided that preserves low peak to average power ratio (PAPR) properties of a single carrier waveform (i.e., at any given time, the channel is contiguous or uniformly spaced in frequency).

For the purposes of the present disclosure, one or more of the following abbreviations may apply:
  AM Acknowledged Mode
  AMD Acknowledged Mode Data
  ARQ Automatic Repeat Request
  BCCH Broadcast Control CHannel
  BCH Broadcast CHannel
  C—Control—
  CCCH Common Control CHannel CCH Control CHannel
CCTrCH Coded Composite Transport Channel
CoMP coordinated multi point
CP Cyclic Prefix
CRC Cyclic Redundancy Check
CTCH Common Traffic CHannel
DCCH Dedicated Control CHannel
DCH Dedicated CHannel
DL DownLink
DL-SCH downlink shared channel
DSCH Downlink Shared CHannel
DTCH Dedicated Traffic Channel
DCI Downlink Control Information
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
LTE Long Term Evolution
LTE-A LTE-Advanced or Long Term Evolution—Advanced
MAC Medium Access Control
MBMS Multimedia Broadcast Multicast Service
MBSFN multicast broadcast single frequency network
MCCH MBMS point-to-multipoint Control CHannel
MCE MBMS coordinating entity
MCH multicast channel
MRW Move Receiving Window
MSB Most Significant Bit
MSCH MBMS point-to-multipoint Scheduling Channel (depending on context)
MSCH MBMS control channel (depending on context)
MTCH MBMS point-to-multipoint Traffic CHannel
PBCH Physical Broadcast CHannel
PCCH Paging Control CHannel
PCFICH Physical Control Format Indicator Channel
PCH Paging CHannel
PDCCH physical downlink control channel
PDSCH physical downlink shared channel
PDU Protocol Data Unit
PHICH Physical Hybrid ARQ Indicator CHannel
PHY PHYsical layer
PhyCH Physical Channels
PMCH Physical Multicast Channel
PRACH Physical Random Access Channel
PUCCH Physical Uplink Control Channel
PUSCH Physical Uplink Shared Channel
RACH Random Access CHannel
RLC Radio Link Control
RRC Radio Resource Control
SAP Service Access Point
SDU Service Data Unit
SHCCH SHared channel Control CHannel
SN Sequence Number
SNR signal-to-noise ratio
SUFI SUper FIeld
TCH Traffic CHannel
TDD Time Division Duplex
TFI Transport Format Indicator
TM Transparent Mode
TMD Transparent Mode Data
TTI Transmission Time Interval
U—User—
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network Long Term Evolution (LTE) is a next-generation evolution of the Universal Mobile Telecommunications System (UMTS), a worldwide protocol family for wireless communications. LTE provides several new technological features compared to previous wireless technologies including OFDM multicarrier transmission, provisions for multiple antennas for both transmit and receive, and an Internet protocol (IP) packet switching network infrastructure. In particular, OFDM relies on a two-dimensional array of orthogonal time and frequency resources which may be aggregated in many flexible ways to provide a wide variety of user services.

In one aspect, a mobile station or mobile terminal that a user carries for wireless communications is known as user equipment (UE). In general, the UE connects to other users either within the wireless network or the general communications infrastructure such as the public switched telephony network (PSTN), Internet, private networks, wide area networks (WANs), etc. via a wireless bidirectional link to an evolved NodeB (eNodeB), also known generically as a base station, which represents the wireless network access node for the UE. Other wireless network elements separate from the access nodes (e.g. eNodeBs) are considered part of the core network (CN). The eNodeB is connected to other network elements such as the serving gateway (S-GW) and the Mobility Management Entity (MME). In one aspect, the S-GW serves as a mobility anchor for data bearers when the UE moves between different eNodeBs. In another aspect, the MME serves as a control entity for managing the signaling between the UE and the core network (CN). The S-GW interfaces with the packet data network gateway (P-GW), which functions as a LTE portal to the global Internet, for example. The P-GW also allocates IP addresses for the UE and enforces quality of service (QoS) based on policy rules.

In one aspect, the downlink resources in LTE are partitioned into smaller elemental time and frequency resources. In one example, in the time dimension, a radio frame has 10 ms duration and is divided into ten subframes, each of 1 ms duration. Furthermore, each subframe is divided into two 0.5 ms slots. In the case of a normal cyclic prefix length, each slot comprises seven OFDM symbols. In the frequency dimension, a Resource Block (RB) is a group of 12 subcarriers each with a subcarrier bandwidth of 15 kHz. A subcarrier is also denoted as a tone, for example. One Resource Element (RE) is the smallest resource unit in LTE which consists of one subcarrier and one OFDM symbol.

In another aspect, certain Resource Blocks are dedicated for special signals such as synchronization signals, reference signals, control signals and broadcast system information. For example, three essential synchronization steps in LTE may be necessary: symbol timing acquisition, carrier frequency synchronization, and sampling clock synchronization. In one example, LTE relies on two special synchronization signals for each cell: the Primary Synchronization Signal (PSS) and the Secondary Synchronization Signal (SSS) which are used for time and frequency synchronization and for broadcasting of certain system parameters such as cell identification, cyclic prefix length, duplex method, etc. In general, the PSS is detected by the UE first, followed by SSS detection.

In one aspect, the PSS is based on a Zadoff-Chu sequence, a constant amplitude chirp-like digital sequence. In general, the PSS is detected non-coherently (i.e., detection without phase information) by the UE since there is assumed to be no a priori channel information available by the UE. In another aspect, the SSS is based on a maximal length sequence (also known as M-sequence). Since the detection of the SSS is performed after the detection of the PSS, if channel state information (CSI) is available to the UE after PSS detection, then coherent detection (i.e., detection with phase information) of the SSS may be available. In certain scenarios, however, non-coherent detection of the SSS may be required, for example, in the case of coherent interference from neighboring eNodeBs.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Channel estimation in OFDM wireless system may employ multiple amplitude signaling schemes that track fading radio channels. OFDM is a significant modulation technique for digital communication on mobile multipath fading channels. In one example, to perform coherent demodulation on the received signals it is necessary to have knowledge of the time-varying channel transfer function.

For OFDM systems, the channel transfer function may be conveniently estimated using a two dimensional grid of pilot symbols, that is, over symbol time and discrete frequency tone. The Digital Video Broadcasting Terrestrial (DVB-T) standard is one such example. However, channel capacity is wasted due to the transmission of the pilot symbols in these systems.

One alternative is to use differential phase shift keying (DPSK) and differentially coherent demodulation to obviate the need for channel estimation. For example, DPSK has been successfully implemented in the Digital Audio Broadcasting standard. However, differential detection results in a bit energy to noise density ratio penalty of, for example, approximately 2 dB for an additive white Gaussian network (AWGN) channel and a larger loss for fading channels.

In one aspect, it is desirable to enable coherent demodulation while implementing channel estimation without the need for pilot symbols. One technique, known as blind channel estimation, has been employed, but its performance has not been comparable to that of pilot-based channel estimation.

In one aspect, a channel matrix is used as a model for the channel propagation characteristics between the transmitter and receiver. Channel estimation then refers to the estimation of the parameters of the channel matrix. Most existing techniques for channel estimation use minimum mean square error (MMSE) or least square (LS) techniques. However, these estimation techniques do not take advantage of channel sparsity, thereby resulting in significant performance loss. In one aspect, compressive sensing (CS) techniques may be used to perform channel estimation under the condition of sparsity, that is, when the channel matrix is comprised of mostly zeros.

Thus, it is desirable to derive channel estimation techniques which outperform current non-compressive sensing approaches for both LTE and WiMax systems, especially for high Doppler fading channels and which also require significantly less pilot symbols.

A high data rate (HDR) subscriber station, referred to herein as an access terminal (AT), may be mobile or stationary and may communicate with one or more HDR base stations, referred to herein as modem pool transceivers (MPTs). An access terminal transmits and receives data packets through one or more model pool transceivers to an HDR base station controller, referred to herein as a model pool controller (MPC). Modem pool transceivers and modem pool controllers are parts of a network called an access network, such as a corporate intranet or the Internet, and may transport data packets between each access terminal and such outside networks. An access terminal that has established an active traffic channel connection with one or more modem pool transceivers may be called an active access terminal, and may be said to be in a traffic state. An access terminal that is in the process of establishing an active traffic channel connection with one or more modem pool transceivers may be in a connection setup state. An access terminal may be any data device that communicates through a wireless channel or through a wired channel, for example, using fiber optic or coaxial cables. An access terminal may further be any of a number of device types including but not limited to a PC card, compact flash device, external or internal modem, or wireless or wireline phone. The communication link through which the access terminal sends signals to the modem pool transceiver is known as a reverse link.

In one aspect, a compressive sensing channel estimation technique based on a Taylor series expansion for narrowband and wideband OFDM systems, such as LTE and WiMax, exhibits superior performance, using less pilots than existing algorithms. In one example, the channel estimation technique uses a low order Taylor series expansion to model fading in the channel impulse response. In one aspect, the delay-Doppler spreading function, which depends on Doppler frequency and delay, is the Fourier transform of the time-delay channel response, which depends on time and delay. In one aspect, the compressive sensing approach exploits channel sparsity, which is not used in conventional channel estimation algorithms.

In one example, a channel impulse response function over L OFDM symbols, assuming the channel impulse response is constant over one OFDM symbol period, may be expressed as:

$$h_p^l$$

with $l=0, 1, \ldots L-1$ and $p=0, 1, \ldots P-1$ and where p is a tap index, l is a symbol index, P is the total number of taps, and L is the total number of OFDM symbols.

In one example, use a Taylor series expansion over one OFDM symbol to obtain the following CIR models, Q=order of the Taylor series:

$$h_p^l = \sum_{q=0}^{Q-1} \alpha_{p,q} l^q$$

-continued $$\underline{h}^l = \sum_{q=0}^{Q-1} \alpha_q l^q$$

In one aspect, a set of Taylor series coefficients over the symbol index l is denoted as $\alpha_q$. In one example, use the discrete Fourier transform (DFT) to obtain a frequency domain response of the channel $\underline{g}^l$, and obtain $$\underline{g}^l = F_p \underline{h}^l$$

$$= \sum_{q=0}^{Q-1} F_p \underline{\alpha} l^q$$

$$= [\, l^{Q-1} F_p \quad l^{Q-2} F_p \quad \ldots \quad l^0 F_p \,] \begin{bmatrix} \alpha_{Q-1} \\ \vdots \\ \alpha_0 \end{bmatrix}$$

where $F_p$ is a Fourier coefficient for path p. Expand a composite frequency domain response $\underline{g}$ for L symbols to obtain:

$$\begin{bmatrix} \underline{g}^0 \\ \vdots \\ \underline{g}^{L-1} \end{bmatrix} = \begin{bmatrix} 0^{Q-1} F_p & 0^{Q-2} F_p & \ldots & 0^0 F_p \\ 1^{Q-1} F_p & 1^{Q-2} F_p & \ldots & 1^0 F_p \\ \vdots & & & \\ (L-1)^{Q-1} F_p & (L-1)^{Q-2} F_p & \ldots & (L-1)^0 F_p \end{bmatrix} \begin{bmatrix} \alpha_0 \\ \vdots \\ \alpha_{Q-1} \end{bmatrix}$$

$\underline{g} = U\alpha$ $\underline{g}: LK \times 1$, $U: LK \times PQ$ $\underline{\alpha}: PQ \times 1$ In one example, minimizing an L1 norm, based on absolute values, exploits the channel sparsity in the channel matrix while an L2 norm, also known as Euclidean distance, fails. In one aspect, the compressive sensing channel estimation is based on a convex L1 norm minimization. In one aspect, the number of pilots and the location of the pilots determine the goodness of a sensing matrix.

In one aspect, a compressive sensing formulation to the problem of channel estimation is to minimize the L1 norm of the vector cc subject to a constraint on the pilot symbols as follows:

$\min \|\alpha\|_1$ $\underline{g}_{(pilot)} = U_{(pilot)} \underline{\alpha}$

A comparison of two example channel impulse response (CIR) models is shown in Table 1, where J is the average number of pilots per symbol. Table 1 shows a comparison of channel impulse response models.

TABLE 1

| CIR model | Formulation | Number of unknowns | Compression ratio | Notes |
|---|---|---|---|---|
| Fourier expansion | g = Wσ | LP | LJ/LP | Number of unknowns is proportional to number of symbols; high complexity |
| Taylor expansion | g = Uα | PQ | LJ/PQ | Q is small, 3~6, number of unknowns is independent of number of symbols; low complexity |

In one aspect, several different techniques may be used for channel estimation. For example, channel estimation may be based on one or more of the following:
  IWF (IFFT/Window/FFT): used in current LTE modems
  2D Wiener: minimum mean square error (MMSE) using genie knowledge about delay profile and Doppler frequency
  Genie: using genie channel information
  CS-Fourier: compressive sensing based on Fourier expansion
  CS-Taylor (Q=3): compressive sensing based on Taylor series expansion (proposed in this disclosure).

In one aspect, the CS-Taylor technique significantly outperforms other techniques. An exception is the Genie technique at middle to high user speeds. In one example, the CS-Taylor technique may significantly outperform the IWF technique even at low user speeds.

Figure 4:
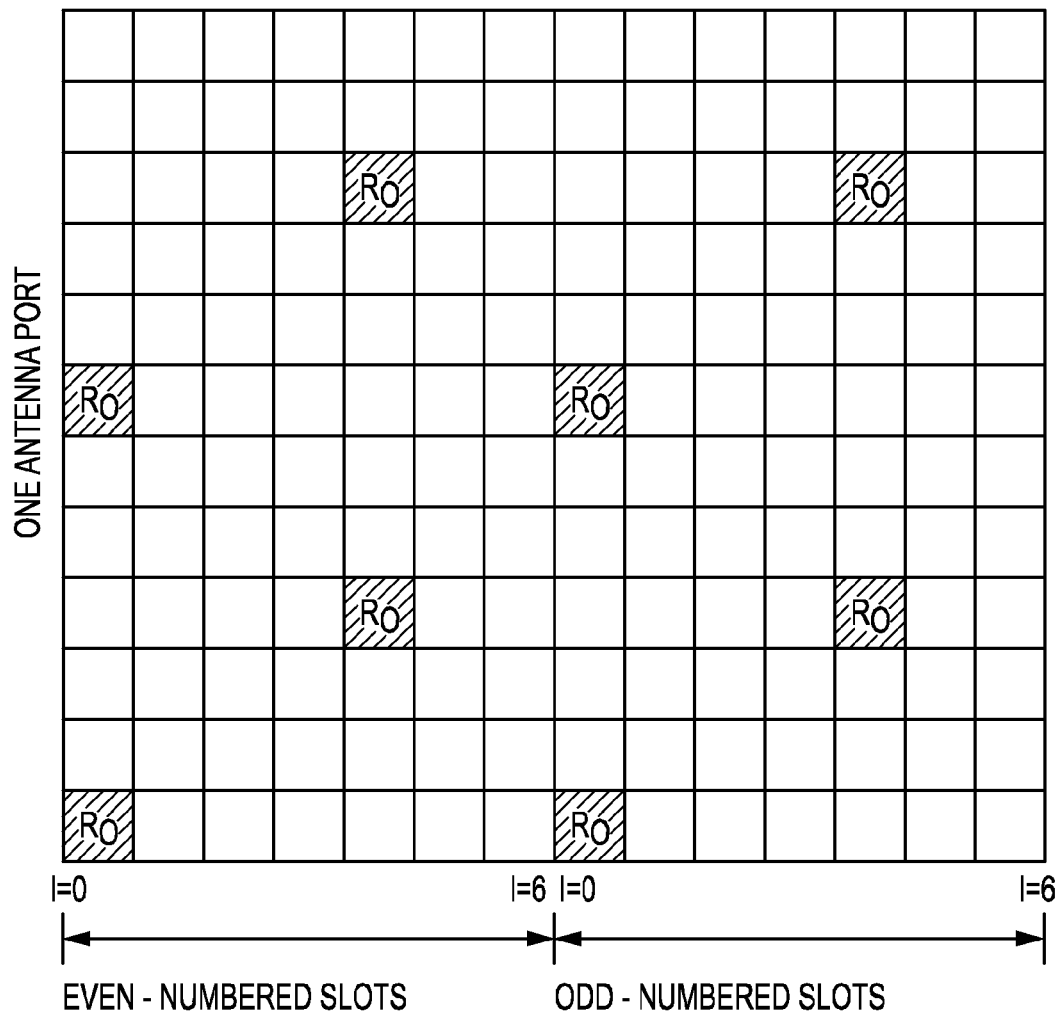
FIG. 4 illustrates an example of LTE reference signal (RS) placement for the case of a single antenna.

FIG. 4 illustrates an example of LTE reference signal (RS) placement for the case of a single antenna. In one aspect, a cell-specific RS is distributed over all frequencies. In one example, each user equipment (UE) is required to demodulate symbols across the entire bandwidth. In another example, channel estimation is performed for each resource element (RE) in the LTE subframe.

Figure 5:
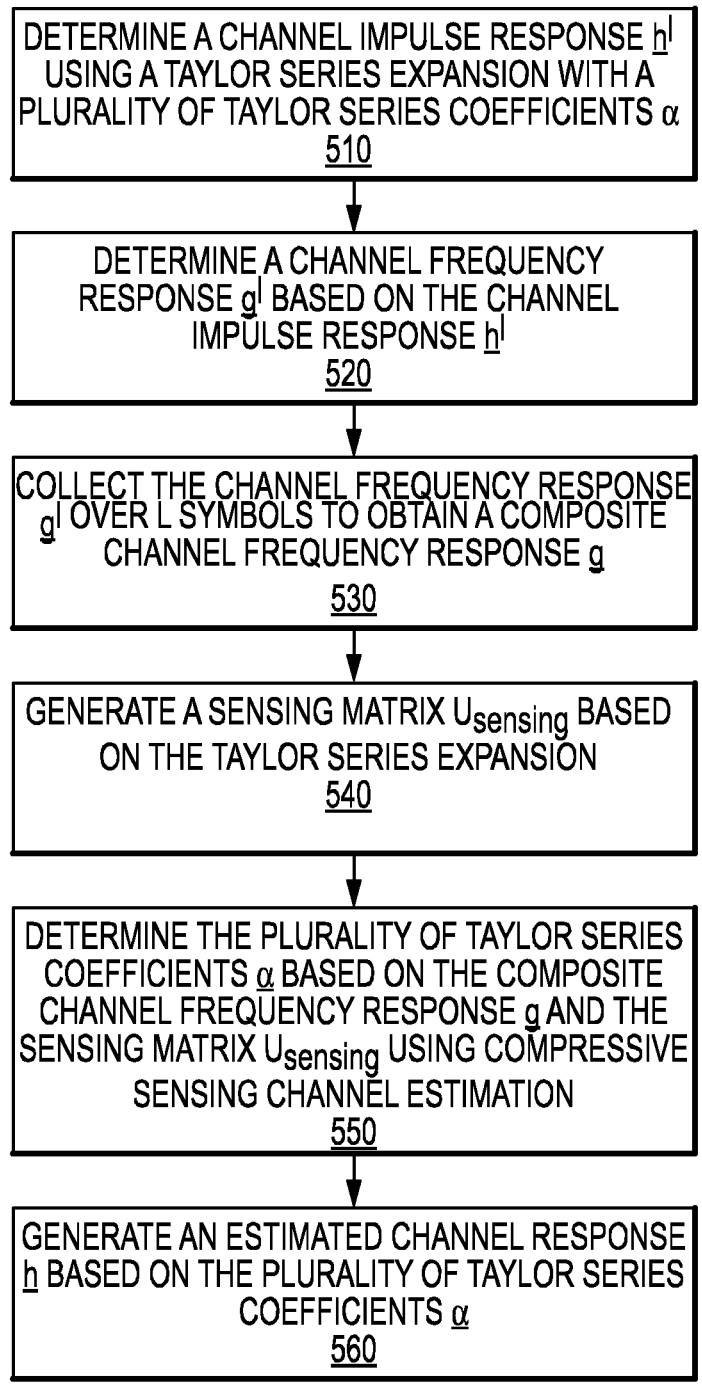
FIG. 5 illustrates an example of a flow diagram for compressive sensing channel estimation using a Taylor series expansion.

FIG. 5 illustrates an example of a flow diagram for compressive sensing channel estimation using a Taylor series expansion. In block 510, determine a channel impulse response $h^l$ using a Taylor series expansion with a plurality of Taylor series coefficients $\alpha$. In one aspect, the channel impulse response $h^l$ is determined over L symbols. In block 520, determine a channel frequency response $g^l$ based on the channel impulse response $h^l$. In one aspect, the channel frequency response $\underline{g}^l$ is determined over L symbols. In one example, the channel frequency response $\underline{g}^l$ is determined using a discrete Fourier transform (DFT). In another aspect, the channel frequency response $\underline{g}^l$ is determined using a fast Fourier transform (FFT).

In block 530, collect the channel frequency response $\underline{g}^l$ over L symbols to obtain a composite channel frequency response g. In block 540, generate a sensing matrix $U_{sensing}$ based on the Taylor series expansion. In one example, the sensing matrix $U_{sensing}$ is based on a set of Fourier coefficients. In block 550, determine the plurality of Taylor series coefficients a based on the composite channel frequency response g and the sensing matrix $U_{sensing}$ using compressive sensing channel estimation. In one aspect, the compressive sensing channel estimation is based on a L1 norm minimization of the plurality of Taylor series coefficients a subject to the constraint that $\underline{g} = U_{sensing} \alpha$ which is evaluated at a plurality of pilot locations, wherein $\underline{g}$ is the composite channel frequency response, $U_{sensing}$ is the sensing matrix $U_{sensing}$ and $\alpha$ is the plurality of Taylor series coefficient. In one aspect, the L1 norm is based on an absolute value minimization. In another aspect, the L1 norm minimization is based on a convex L1 norm minimization. And, in block 560, generate an estimated channel response h based on the plurality of Taylor series coefficients $\underline{\alpha}$.

One skilled in the art would understand that the steps disclosed in the example flow diagram in FIG. 5 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 6:
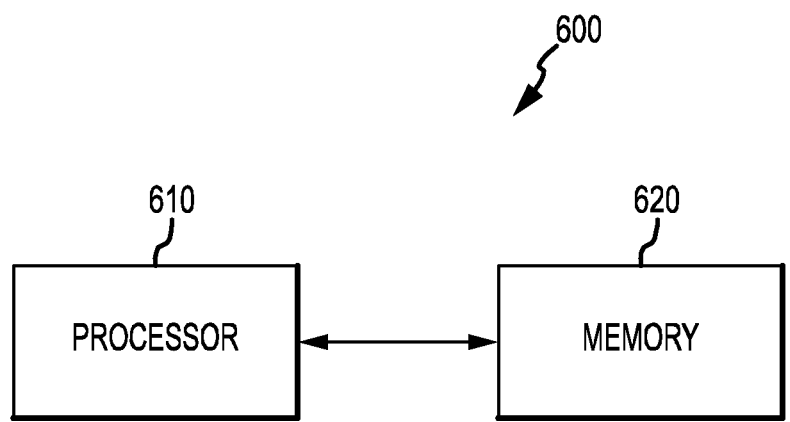
FIG. 6 illustrates an example of a device comprising a processor in communication with a memory for executing the processes for compressive sensing channel estimation using a Taylor series expansion.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 6 illustrates an example of a device 600 comprising a processor 610 in communication with a memory 620 for executing the processes for compressive sensing channel estimation using a Taylor series expansion. In one example, the device 600 is used to implement the algorithm illustrated in FIG. 5. In one aspect, the memory 620 is located within the processor 610. In another aspect, the memory 620 is external to the processor 610. In one aspect, the processor includes circuitry for implementing or performing the various flow diagrams, logical blocks and/or modules described herein.

Figure 7:
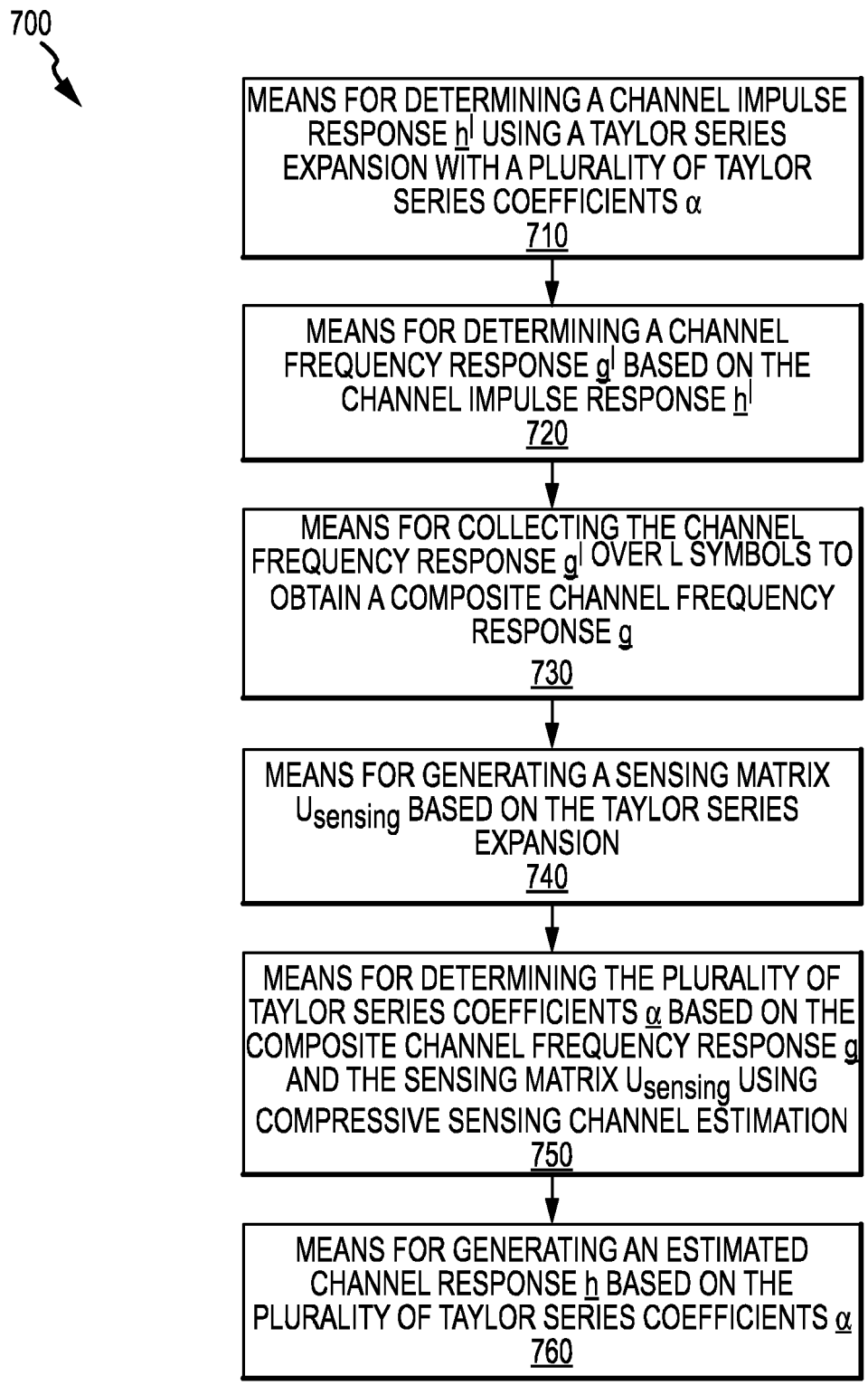
FIG. 7 illustrates an example of a device suitable for channel estimation using compressive sensing using a Taylor series expansion.

FIG. 7 illustrates an example of a device 700 suitable for channel estimation using compressive sensing using a Taylor series expansion. In one aspect, the device 700 is implemented by at least one processor comprising one or more modules configured to provide different aspects of channel estimation using compressive sensing using a Taylor series expansion as described herein in blocks 710, 720, 730, 740, 750 and 760. For example, each module comprises hardware, firmware, software, or any combination thereof. In one aspect, the device 700 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for channel estimation comprising:
   determining a channel impulse response using a Taylor series expansion with a plurality of Taylor series coefficients;
   determining a channel frequency response based on the channel impulse response;
   collecting the channel frequency response over a plurality of symbols to obtain a composite channel frequency response;
   generating a sensing matrix based on the Taylor series expansion; and
   determining the plurality of Taylor series coefficients based on the composite channel frequency response and the sensing matrix using compressive sensing channel estimation.

2. The method of claim 1 further comprising generating an estimated channel response based on the plurality of Taylor series coefficients.

3. The method of claim 1 wherein the channel impulse response is determined over L symbols.

4. The method of claim 3 wherein the channel frequency response is determined over the L symbols.

5. The method of claim 1 wherein the channel frequency response is determined using a discrete Fourier transform (DFT).

6. The method of claim 1 wherein the channel frequency response is determined using a fast Fourier transform (FFT).

7. The method of claim 2 wherein the sensing matrix is based on a set of Fourier coefficients.

8. The method of claim 2 wherein the compressive sensing channel estimation is based on a L1 norm minimization of the plurality of Taylor series coefficients subject to the constraint that $\underline{g}=U_{sensing}\,\underline{\alpha}$ which is evaluated at a plurality of pilot locations, wherein $\underline{g}$ is the composite channel frequency response, $U_{sensing}$ is the sensing matrix $U_{sensing}$ and $\underline{\alpha}$ is the plurality of Taylor series coefficients.

9. The method of claim 8 wherein the L1 norm minimization is based on an absolute value minimization.

10. The method of claim 9 wherein the L1 norm minimization is based on a convex L1 norm minimization.

11. An apparatus for channel estimation comprising:
   means for determining a channel impulse response using a Taylor series expansion with a plurality of Taylor series coefficients;
   means for determining a channel frequency response based on the channel impulse response;
   means for collecting the channel frequency response over a plurality of symbols to obtain a composite channel frequency response;
   means for generating a sensing matrix based on the Taylor series expansion; and
   means for determining the plurality of Taylor series coefficients based on the composite channel frequency response and the sensing matrix using compressive sensing channel estimation.

12. The apparatus of claim 11 further comprising means for generating an estimated channel response based on the plurality of Taylor series coefficients.

13. The apparatus of claim 11 wherein the channel impulse response is determined over L symbols.

14. The apparatus of claim 13 wherein the channel frequency response is determined over the L symbols.

15. The apparatus of claim 11 wherein the channel frequency response is determined using a discrete Fourier transform (DFT).

16. The apparatus of claim 11 wherein the channel frequency response is determined using a fast Fourier transform (FFT).

17. The apparatus of claim 12 wherein the sensing matrix is based on a set of Fourier coefficients.

18. The apparatus of claim 12 wherein the compressive sensing channel estimation is based on a L1 norm minimization of the plurality of Taylor series coefficients subject to the constraint that $\underline{g}=U_{sensing}\,\underline{\alpha}$ which is evaluated at a plurality of pilot locations, wherein $\underline{g}$ is the composite channel frequency response, $U_{sensing}$ is the sensing matrix $U_{sensing}$ and $\underline{\alpha}$ is the plurality of Taylor series coefficients.

19. The apparatus of claim 18 wherein the L1 norm minimization is based on an absolute value minimization.

20. The apparatus of claim 19 wherein the L1 norm minimization is based on a convex L1 norm minimization.

21. An apparatus for channel estimation comprising a processor and a memory, the memory containing program code executable by the processor for performing the following:
   determining a channel impulse response using a Taylor series expansion with a plurality of Taylor series coefficients;
   determining a channel frequency response based on the channel impulse response;
   collecting the channel frequency response over a plurality of symbols to obtain a composite channel frequency response;
   generating a sensing matrix based on the Taylor series expansion; and
   determining the plurality of Taylor series coefficients based on the composite channel frequency response and the sensing matrix using compressive sensing channel estimation.

22. The apparatus of claim 21 wherein the memory further comprising program code for generating an estimated channel response based on the plurality of Taylor series coefficients.

23. The apparatus of claim 21 wherein the channel impulse response is determined over L symbols.

24. The apparatus of claim 23 wherein the channel frequency response is determined over the L symbols.

25. The apparatus of claim 21 wherein the channel frequency response is determined using a discrete Fourier transform (DFT).

26. The apparatus of claim 21 wherein the channel frequency response is determined using a fast Fourier transform (FFT).

27. The apparatus of claim 22 wherein the sensing matrix is based on a set of Fourier coefficients.

28. The apparatus of claim 22 wherein the compressive sensing channel estimation is based on a L1 norm minimization of the plurality of Taylor series coefficients subject to the constraint that $\underline{g}=U_{sensing}\,\underline{\alpha}$ which is evaluated at a plurality of pilot locations, wherein $\underline{g}$ is the composite channel frequency response, $U_{sensing}$ is the sensing matrix $U_{sensing}$ and $\underline{\alpha}$ is the plurality of Taylor series coefficients.

29. The apparatus of claim 28 wherein the L1 norm minimization is based on an absolute value minimization.

30. The apparatus of claim 29 wherein the L1 norm minimization is based on a convex L1 norm minimization.

31. A non-transitory computer-readable medium for channel estimation, the computer-readable medium storing a computer program, wherein execution of the computer program is for:
   determining a channel impulse response using a Taylor series expansion with a plurality of Taylor series coefficients;
   determining a channel frequency response based on the channel impulse response;
   collecting the channel frequency response over a plurality of symbols to obtain a composite channel frequency response;
   generating a sensing matrix based on the Taylor series expansion; and
   determining the plurality of Taylor series coefficients based on the composite channel frequency response and the sensing matrix using compressive sensing channel estimation.

32. The non-transitory computer-readable medium of claim 31 wherein execution of the computer program is also for generating an estimated channel response based on the plurality of Taylor series coefficients.

33. The non-transitory computer-readable medium of claim 31 wherein the channel impulse response is determined over L symbols.

34. The non-transitory computer-readable medium of claim 33 wherein the channel frequency response is determined over the L symbols.

35. The non-transitory computer-readable medium of claim 31 wherein the channel frequency response is determined using a discrete Fourier transform (DFT).

36. The non-transitory computer-readable medium of claim 31 wherein the channel frequency response is determined using a fast Fourier transform (FFT).

37. The non-transitory computer-readable medium of claim 32 wherein the sensing matrix is based on a set of Fourier coefficients.

38. The non-transitory computer-readable medium of claim 32 wherein the compressive sensing channel estimation is based on a L1 norm minimization of the plurality of Taylor series coefficients subject to the constraint that $\underline{g} = U_{sensing} \underline{\alpha}$ which is evaluated at a plurality of pilot locations, wherein $\underline{g}$ is the composite channel frequency response, $U_{sensing}$ is the sensing matrix $U_{sensing}$ and $\underline{\alpha}$ is the plurality of Taylor series coefficients.

39. The non-transitory computer-readable medium of claim 38 wherein the L1 norm minimization is based on an absolute value minimization.

40. The non-transitory computer-readable medium of claim 39 wherein the L1 norm minimization is based on a convex L1 norm minimization.

\* \* \* \* \*